US005288463A

United States Patent [19]

Chemelli

[11] Patent Number: 5,288,463

[45] Date of Patent: Feb. 22, 1994

[54] POSITIVE FLOW CONTROL IN AN UNVENTED CONTAINER

[75] Inventor: John B. Chemelli, Webster, N.Y.

[73] Assignee: Eastman Kodak Company, Rochester, N.Y.

[21] Appl. No.: 42,361

[22] Filed: Apr. 2, 1993

Related U.S. Application Data

[63] Continuation-in-part of Ser. No. 965,683, Oct. 23, 1992, abandoned.

[51] Int. Cl.[5] ...................... G01N 21/05; G01N 21/03

[52] U.S. Cl. ........................................ 422/58; 422/61; 422/102; 422/103; 435/287; 435/301; 436/165; 436/180; 436/808

[58] Field of Search .................... 422/58, 61, 102-103; 435/287, 301; 436/165, 180, 808; 383/35, 120, 66, 84

[56] References Cited

U.S. PATENT DOCUMENTS 4,643,973 2/1987 Avery ................................ 435/287
4,673,657 6/1987 Christian ............................ 436/501
4,985,204 1/1991 Klose et al. .......................... 422/56
5,072,935 12/1991 McWain ............................. 272/119
5,154,888 10/1992 Zander et al. ........................ 422/58

FOREIGN PATENT DOCUMENTS 381501 8/1990 European Pat. Off. .

*Primary Examiner*—James C. Housel
*Assistant Examiner*—Rachel Heather Freed
*Attorney, Agent, or Firm*—Dana M. Schmidt

[57] ABSTRACT

A containment device, such as a cuvette, for use in amplifying and detecting nucleic acid material at a contained detection site. A waste compartment provided downstream from the detection site is provided with fold lines that give the compartment a bi-stable configuration, so that it can expand to relieve back-pressure that otherwise builds up in such a containment device. Also, optimal locations of flow paths between compartments are described to minimize back-flow of upstream reagents into the feeder paths that are yet to be used by subsequent compartments.

7 Claims, 4 Drawing Sheets

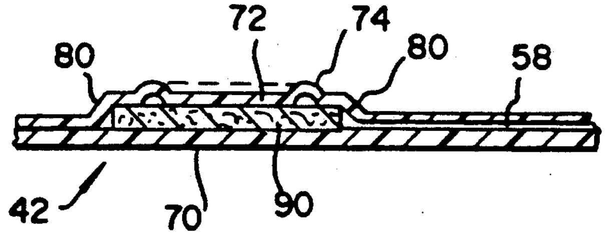
FIG. 2
FIG. 3
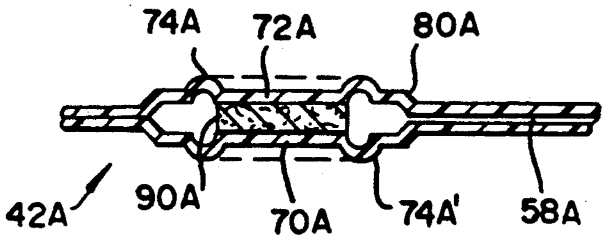
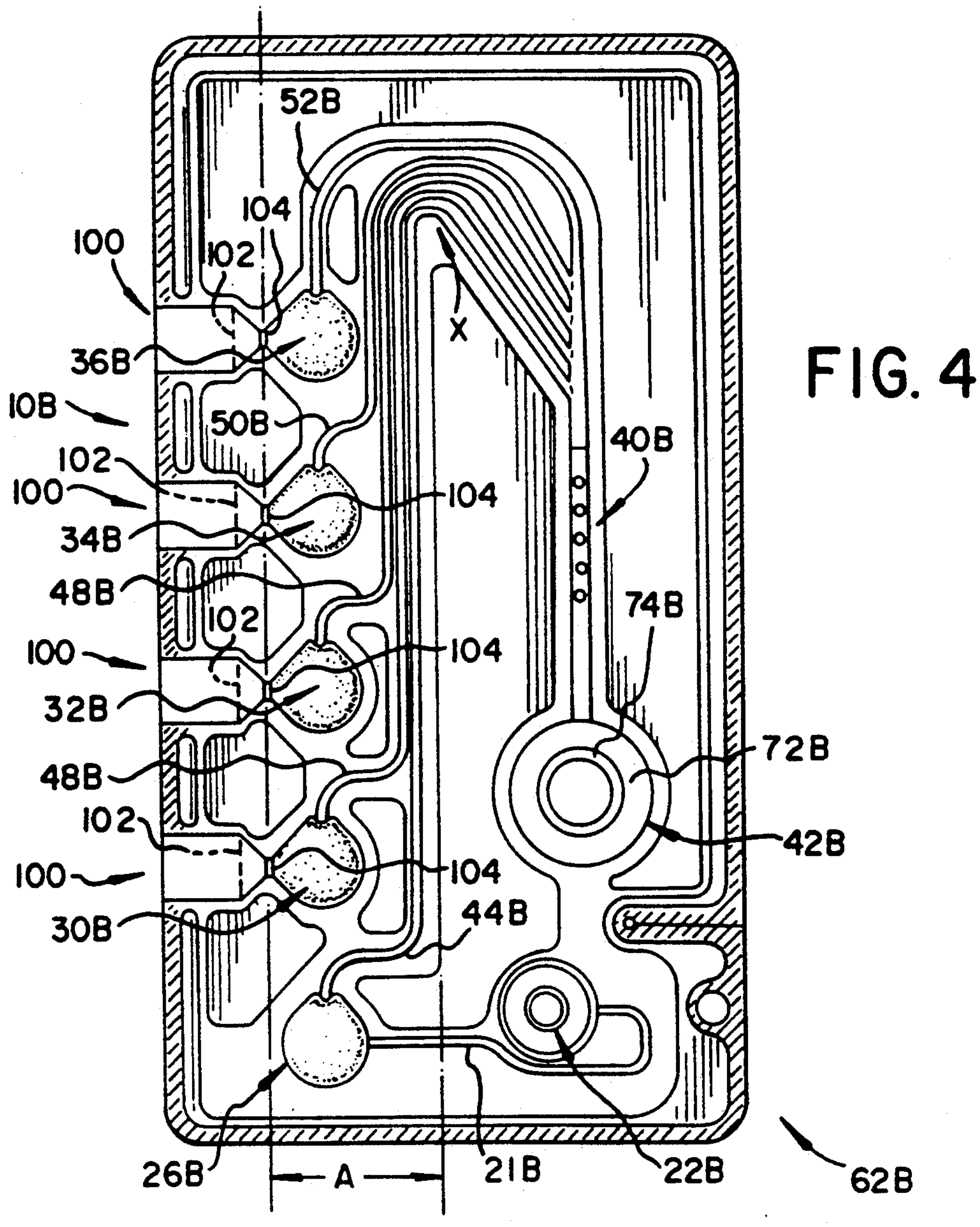
FIG. 4

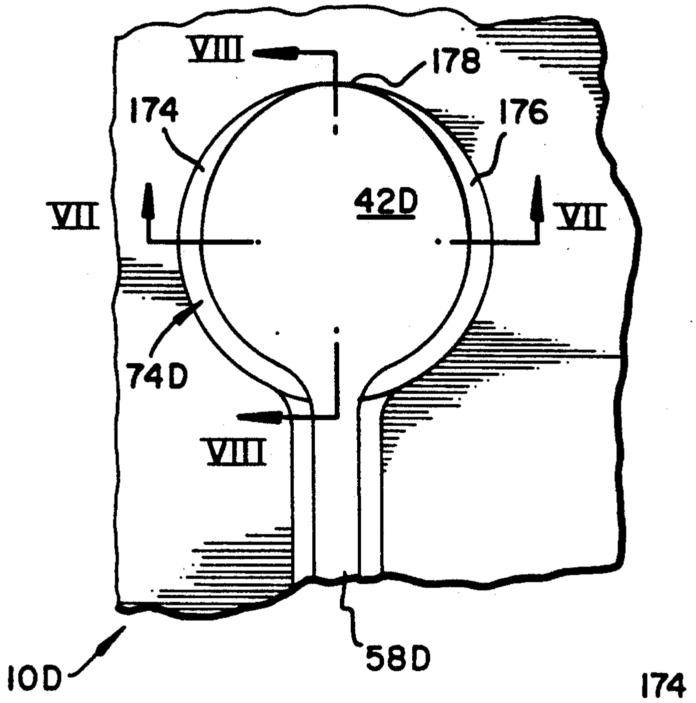
FIG. 6
FIG. 7A
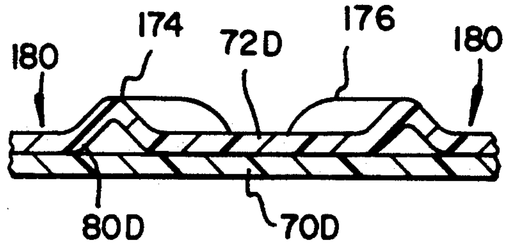
FIG. 7B
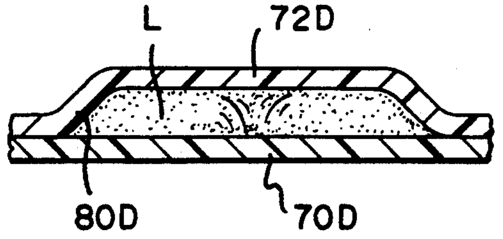
FIG. 8
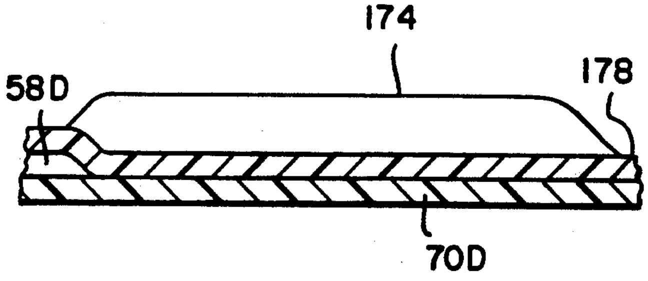
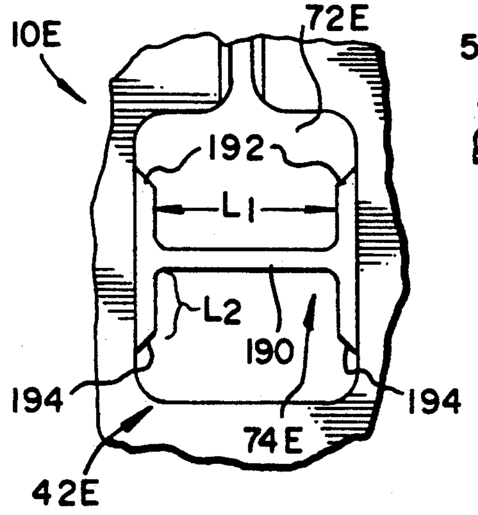
FIG. 9

POSITIVE FLOW CONTROL IN AN UNVENTED CONTAINER

RELATED APPLICATIONS

This application is a continuation-in-part application of U.S. Ser. No. 965,683, filed on Oct. 23, 1992, now abandoned.

FIELD OF THE INVENTION

This invention relates to containment devices used to process a liquid under contained conditions, including detection of analyte and collection of waste liquids.

BACKGROUND OF THE INVENTION

It is known to do PCR or other forms of DNA amplification in a containment device, using, for example, a flexible pouch. Such is described in EPA 381,501, wherein flow of target and reagents proceeds past a detection chamber and into a dead-end waste compartment.

Although such a device is very effective, the use of a dead-end waste compartment can create on occasion a problem. That is, sufficient back-pressure from incoming flow can be created so as to interfere with the sequential reactions desired at the detection chamber. For example, back pressure tends to stress the detection chamber to the point that beads used to anchor the target can themselves become dislodged.

The most obvious solution to back-pressure caused by a dead-end waste compartment is to vent that compartment to the atmosphere. However, that is unacceptable since it defeats the first principle of PCR devices, namely that of keeping contained the amplified product.

Accordingly, prior to this invention it has not always been possible to ensure that no undesirable back- pressure will be created by a waste compartment such as might interfere with optimum results.

SUMMARY OF THE INVENTION

I have constructed a containment device that avoids the above-noted problems.

More specifically, there is provided in accord with one aspect of the invention, a containment device for use in amplifying and detecting nucleic acid materials. The device comprises a reaction compartment with reagents for amplifying nucleic acid material, a detection site, flow means allowing fluid flow from the compartment to the site, reagents allowing detection at the site of amplified nucleic acid material, and a waste compartment downstream of the detection site and fluidly connected thereto to receive reagents and material after passage over the site, all of the compartment, detection site, and reagents being confined within the device by structure that is sealable after sample insertion to prevent leakage of nucleic acid material, the waste compartment comprising opposing walls at least one of which is provided with fold lines so as to have a bi-stable configuration, one of said configurations being that in which the at least one wall is collapsed proximal to another of the defining opposing walls, and the other of the configurations being that in which the at least one wall is expanded more distally away from the other opposing wall, so that the build-up of pressure in the waste compartment is relieved by the movement of the at least one wall from the one configuration to the other configuration.

Accordingly, the invention provides the advantageous feature of a containment device with a dead-end waste compartment that minimizes the build-up of back pressures as the waste compartment fills up, without leaking the contents of the device to the atmosphere.

Other advantageous features will become apparent upon reference to the following Detailed Description of the Preferred Embodiments, when read in light of the attached drawings.

SUMMARY OF THE DRAWINGS

FIG. 2 is a fragmentary section view taken generally along the line II—II of FIG. 1;

FIG. 3 is a section view similar to that of FIG. 2, but of an alternative embodiment;

FIGS. 4 and 5 are plan views similar to that of FIG. 1, but of still other alternative embodiments;

FIG. 6 is a fragmentary plan view similar to that of FIG. 5, but of yet another embodiment of the invention;

FIGS. 7A and 7B are section views taken along the line VII—VII of FIG. 6, before and after, respectively, sufficient liquid has entered the waste compartment to expand outward the creased opposing wall;

FIG. 8 is a fragmentary section view taken along the line VIII—VIII of FIG. 6; and FIG. 9 is a fragmentary plan view similar to that of FIG. 6, but of still another embodiment.

DETAILED DESCRIPTION OF THE PREFERRED EMBODIMENT

The invention is hereinafter described in connection with certain preferred embodiments, in which a particular flexible device is processed by a certain processor for amplification and detection of DNA. Additionally, the invention is useful regardless of the peculiar construction of the device and/or processor, and regardless whether the device is processed horizontally or while inclined, as long as there is a waste compartment which receives liquid from a detection site, with the risk of the build-up of back pressure in such compartment. Still further, it is useful regardless of the liquid contents of the device—that is, this invention does not concern or require any particular chemistry or reaction, so long as the reaction is contained in a closed device. Hence, the invention is independent of the particular liquid reaction occurring at the detection chamber and is not limited just to detection of nucleic acid materials.

Figure 1:
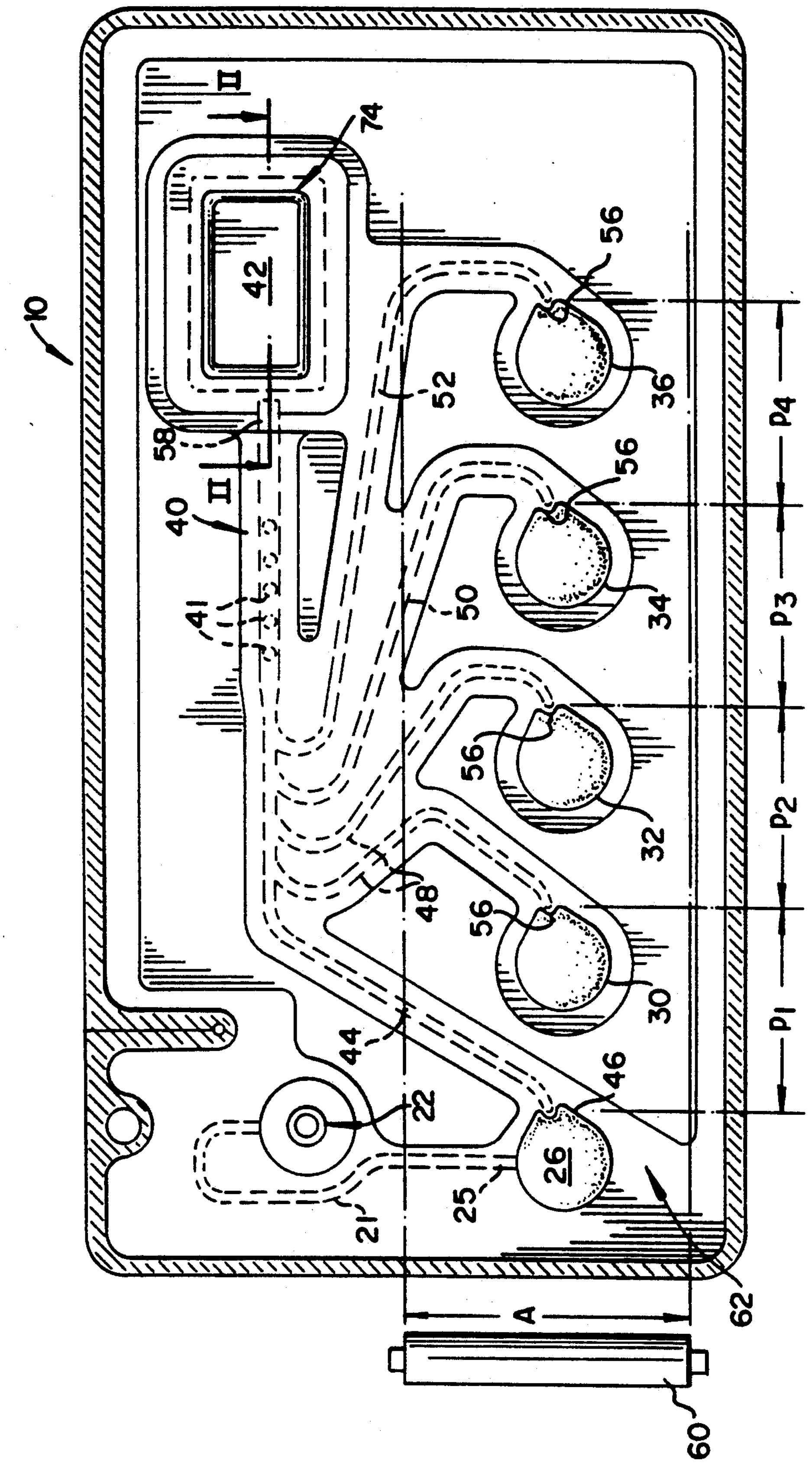
FIG. 1 is a plan view of a device constructed in accordance with the invention.

As shown in FIG. 1, reaction cuvettes 10 useful with the invention comprise a pair of sheet materials secured together in such a manner so as to provide the cuvette with an inlet port 22 for patient injection of sample liquid, which connects via a passageway 21 to a PCR reaction compartment 26. A seal 46 temporarily blocks flow out of compartment 26. When seal 46 is broken, liquid feeds via a passageway 44 to a detection chamber 40 having sites 41 comprising, preferably, beads anchored in place which will complex with any targeted analyte passing them from compartment 26, and then with reagents coming from he other reagent compartments. Those other compartments are compartments 30, 32, 34 and optionally additional compartments 36, each feeding via passageways 48, 50, and 52, to chamber 40. Each of those passageways is temporarily sealed at 56, and contains an appropriate reagent liquid (and possibly, residual air).

The details of the chemicals useful in all the compartments, and of the sites 41, are explained in more detail in the aforesaid EPA 381,501. However, since the time of the invention of EPA 381,501, the number of necessary compartments has been simplified. Hence compartments 26, 30, 32, and 34 preferably comprise:

Compartment 26, in addition to the patient liquid later added by the user, can include all the conventional reagents needed for PCR amplification, kept in place by temporary seal 25. This includes primers that are bound to one member of a binding pair, the other member of which appears in compartment 30 described below. A useful example of the binding member attached to a primer is biotin. (Seal 25 is burst by injecting sample.) Alternatively, the reagents can be injected with the sample, so that seal 25 is eliminated.

Compartment 30 comprises, preferably, an enzyme bound to a complexing agent, such as avidin, that is a member of a binding pair, the other member of that pair being bound to a targeted analyte in the reaction compartment 26 as described above. Hence, a useful reagent in compartment 30 is strep-avidin horseradish peroxidase (hereinafter, strep-avidin HRP).

Compartment 32 preferably comprises a wash solution as the reagent.

Compartment 34 preferably comprises a signal precursor, and any dye stabilizing agent that may be useful. Thus, for example, a useful reagent solution in compartment 34 is a solution of a leuco dye that is a conventional substrate for the enzyme of compartment 30.

The remaining compartments 36 are preferably eliminated, along with their passageways, but can be optionally added. Hence, if a second wash is desired prior to adding the leuco dye of compartment 34, then such wash is provided by compartment 34 and the leuco dye is moved to compartment 36, and so forth.

Compartment 40 feeds to compartment 42 via passageway 58. Compartment 42 is the waste-collecting compartment to which the invention is particularly applicable, as described hereinafter.

Roller 60 exemplifies the exterior pressure means used to burst each of the compartments sequentially, to sequentially advance the contents of the respective compartment to detection chamber 40. Roller 60 advances along path 62 having width "A".

Distances P1, P2, etc, between the exit locations for each burstable compartment are preferably equal.

Sealing of port 22 occurs by folding over the upper left corner of the cuvette, FIG. 1, to crimp off passageway 21, as is taught in U.S. Pat. No. 5,154,888, FIG. 6.

In accordance with the invention, waste compartment 42 is intended to receive all excess liquids flowing past the detection sites in compartment 40, without creating back-pressure due to the absence of an outlet. This is achieved by forming waste compartment 42 comprising opposing side walls 70, 72, FIG. 2, which provide the major interior surface area of the compartment (in contrast to side walls 80), that is, at least 51% of the total surface area. At least wall 72 has therein sufficient fold lines 74 to provide wall 72 with a bi-stable configuration. The fold lines are formed in at least one of the opposing walls of the pair 70,72, as to project a bead out of the plane of that opposing wall. The fold lines and the bead can either be a continuous, closed loop, or a majority fraction of a closed loop, e.g., at least 50% of the loop that would be formed if the fold lines and bead extended all the way around. Further, the fold lines and bead can either be at the perimeter of the waste compartment, or just inside that perimeter.

As shown in FIG. 1, fold lines 74 form a closed loop, that most preferably traces a pattern, FIG. 1, that is congruent with the overall shape, and inside the perimeter, of compartment 42 as determined by the side walls 80. Walls 80 connect walls 70 and 72, FIG. 2, to form the sealed enclosure of the compartment except for incoming passageway 58. As shown, that shape is roughly a rectangle. Other shapes will be readily apparent.

The bi-stable configuration will be readily apparent. Initially, wall 72 is collapsed as shown in the solid lines, so it is proximal to wall 70. However, as liquid moves into compartment 42, wall 72 snaps outwardly along fold line 74, to occupy the phantom position, thus relieving any back-pressure that is created. In actuality, back-pressure first builds up to a point sufficient to snap wall 72 outwardly, at which point the pressure in compartment 42 becomes negative until more liquid comes in.

Optionally, more than one fold line can be present (not shown), to provide, e.g., concentric shapes that in turn allow for greater expansion of the wall; e.g., there could be included another fold line inside that of line 74, tracing a concentric rectangle.

Optionally, an expansion pad 90 is included, which when wetted tends to expand, further aiding in the process of pushing wall 72 to its outward position where it is distal to wall 70. Such pad can be any conventional sponge, such as a commercially available cellulose sponge dried to a compressed state.

As a further alternative embodiment, FIG. 3, both walls of the waste compartment can have the fold lines so that both walls have a bi-stable configuration. Parts similar to those previously shown bear the same reference numeral, to which the distinguishing suffix "A" is appended.

Thus, waste compartment 42A is constructed as in the embodiment of FIG. 2, except that wall 70A has a fold line 74A' that is similar to fold line 74A of wall 72A. The solid line positions are of course the collapsed configuration where the two opposing walls are proximal, whereas the phantom positions are the expanded configurations in which the walls are distal to each other. Greater expansion is possible when both walls are so provided. As before, optional pad 90A can be present, preferably adhered to one or the other of walls 70A or 72A if present.

The paths traced by passageways 44, 48, 50 and 52 need not be as shown, nor need they extend so far away from path 62 of roller 60. Instead, the passageways can be disposed so that the majority of their path length (at least one-half) is within path 62 of the roller, FIG. 4. Parts similar to those perviously described bear the same reference numeral, to which the distinguishing suffix "B" is applied.

Thus, cuvette 10B has inlet port 22B and all the compartments 26B, 30B, 32B, 34B, 36B, 40B and 42B of the previous embodiment, with passageways 44B, 48B, 50B and 52B, respectively, providing flow means connecting the upstream compartments with compartments 40B and 42B. Waste compartment 42B has the fold line 74B to allow at least wall 72B to snap outward to relieve back-pressure. However, unlike the previous embodiments, passageways 48B and 50B have a majority of their paths extending parallel and closely adjacent to the path of passageway 44B providing the flow means from compartment 26B so that application of the roller pressure along a path having a width "A", will cause the roller to at some point compress each of the noted passageways along at least half of their length. Such coverage by the roller allows for better positive control of the emptying of each respective passageway. That is, as long as the roller is pinching off each passageway, including passageway 44B, which occurs up to point "X," there can be no "back-flow" into that passageway such as might disturb proper sequential delivery of reagents to the detection sites.

Optionally, each of the compartments 30B, 32B, 34B and 36B can be provided with a side-fill port 100, such that the filling proceeds by filling each compartment out to line 102, eliminating any air, and thereafter heat-sealing the opposing walls together at 104 through the liquid, as is conventional. This ensures that no air bubbles will be pushed by the external roller into compartment 40B where they might interfere with the liquid-phase reactions that occur.

Figure 5:
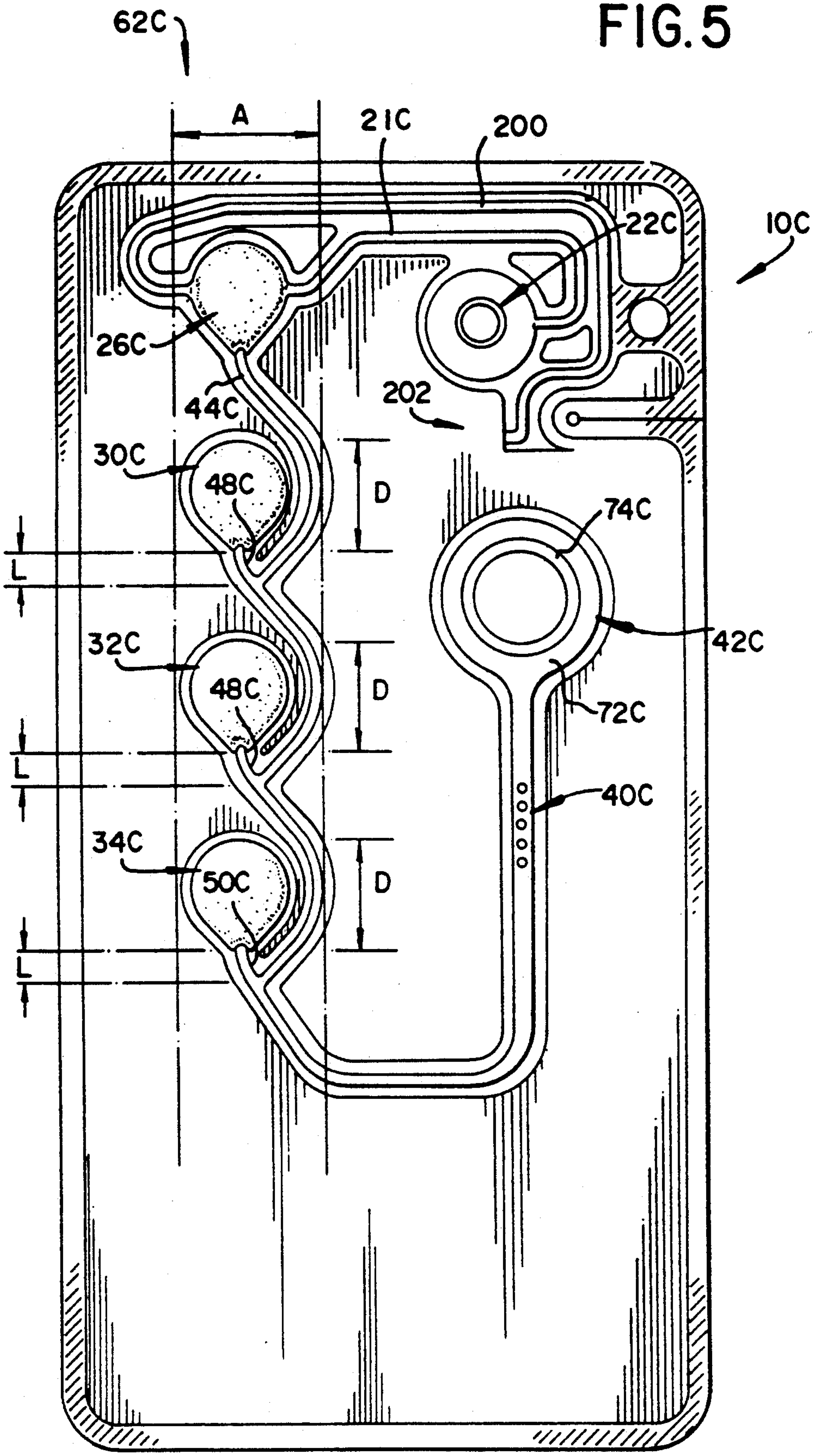

However, each passageway in the embodiment of FIG. 4 has a substantial length from its respective burstable compartment, to the location where it joins the other passageways just upstream of compartment 40B. This is the feeder portion of each passageway. It is not necessary that this be so. Rather, the feeder portion length of the passageway from its compartment to the junction location with other passageways can be minimized to the extent that the length is less than the maximum diameter of the burstable compartment from which it extends, FIG. 5. Parts similar to those previously described bear the same reference numeral, to which the distinguishing suffix "C" is applied.

Thus, cuvette 10C has inlet port 22C and all the compartments 26C, 30C, 32C, 34C, 40C and 42C of the previous embodiments, with passageways 44C, 48C, and 50C, respectively, providing the flow means connecting the upstream compartments with compartments 40C and 42C. Waste compartment 42C has the fold line 74C to allow at least wall 72C to snap outward to relieve back-pressure.

However, unlike the previous embodiments, each passageway 48C and 50C has a junction with passageway 44C such that the length "L" of the passageway from its respective burstable storage compartment, to the junction, is less than the maximum dimension "D" of its storage compartments. (As shown, that dimension is measured from the future exit aperture of the compartment to an opposite point closest to the next upstream compartment, due to the tear-drop shape of the compartments.) In fact, most preferably "L" is less than one-half of "D" for a respective compartment. Such an arrangement further minimizes back-flow of reagent from an upstream compartment into the passageway length "L," prior to expulsion of the contents of the storage compartment through length "L." This in turn minimizes undesired side-reactions that might occur between reagents in path length "L" rather than in compartment 40 where they are desired.

As before, preferably roller path 62C covers the majority of the path lengths of the passageways.

Optionally, an air vent path 200 can be provided from reaction compartment 26C back into a sealed portion of the pouch, e.g., to dead storage area 202 of the pouch, to minimize build-up of back-pressure such as might inhibit ingestion of sample from port 22C along passageway 21C. However, as with all flow lines and compartments, path 200 is also sealed from leakage to the atmosphere to provide positive containment against leakage of amplified nucleic acid material that could cause carry-over contamination.

Inlet port 22C and passageway 200 are preferably closed and sealed, following sample injection, by folding over the corner as with the previous embodiments, all as described in the aforesaid U.S. Pat. 5,154,888.

It is not necessary that the fold line of the waste compartment providing the bi-stable configuration be spaced inside the perimeter, or that the fold line crease form a completely closed loop. An alternative to these is shown in FIGS. 6–8, where parts corresponding to those preciously described bear the same reference numeral to which the suffix "D" is appended.

Thus, cuvette 10D, FIG. 6, is constructed as in the previous embodiments, except that waste compartment 42D has a fold line 74D in opposing wall 72D, FIG. 7A, forming a crease or bead that does not join itself to form a closed loop, and it is at the periphery of the compartment, rather than spaced inside. Thus, fold line 74D is formed into parts 174 and 176 which are a majority fraction of the periphery, or a majority of what would be a closed loop if it did extend to join both parts 174 and 176 together. ("Majority" as applied to fold line 74D means, at least about 50%, since amounts less than this are unlikely to allow wall 72D, FIG. 7A, to move far enough out when liquid L enters, FIG. 7B.)

When liquid enters compartment 42D, wall 72D eventually pops out from its collapsed configuration or position, FIG. 7A, to its expanded, second configuration or position, FIG. 7B, due to its bistable construction. Only the portion 178 of wall 72D that is pinch-sealed to opposing wall 70D, FIG. 8, remains unexpanded.

Side wall 80D is unaffected by the in-flowing liquid. That is, as in the previously described embodiment, it does not expand sideways from its original position shown in FIG. 7B, as indeed it cannot since it is sealed at 180 to opposing wall 70D.

All of the periphery, e.g., at portions 180, FIG. 7A, of compartment 42D is sealed shut permanently by sealing wall 72D to wall 70D at those locations, except for passageway 58D, FIGS. 6 and 8.

Yet another example is shown in FIG. 9, wherein the same reference numerals are used for similar parts, with the exception of the distinguishing suffix "E". Thus, as in previous embodiments, cuvette 10E features a waste compartment 42E having fold lines 74E in one of its paired opposite walls 72E that forms the major interior surface area of the compartment. However, in this case the fold lines form a beaded crease generally in the shape of an "H", comprising a cross-member 190 and legs 192 and 194. The linear extent of the crease, defined as $(L_1+4+L_2)$, is such as to comprise at least about 50% of what would exist if lines 74E formed a closed loop around the periphery. The expansion of wall 72E outward will, of course, peak along cross-member 190, when liquid enters compartment 42E.

The invention has been described in detail with particular reference to preferred embodiments thereof, but it will be understood that variations and modifications can be effected within the spirit and scope of the invention. For example, although other features can be added besides those described, it is also useful free of any other features. That is, it can consist of only the enumerated parts.

What is claimed is:

1. A containment device for use in amplifying and detecting nucleic acid material comprising a pair of sheet materials secured together in such a manner so as to provide a cuvette including a reaction compartment with reagents for amplifying nucleic acid material, a detection site, flow means allowing fluid flow from said compartment to said site, reagents allowing detection at said site of amplified nucleic acid material, and a waste compartment downstream of said detection site and fluidly connected thereto to receive reagents and nucleic acid material after passage over said site, all of said compartment, detection site, and reagents being confined within said pair of sheet materials, said sheet materials being sealable after sample insertion to prevent leakage of nucleic acid material, said waste compartment comprising a pair of opposing walls that provide the major interior surface area of the compartment, each of said sheet materials defining one of said opposing walls, at least one of said opposing walls being provided with fold lines along a crease so as to have a bi-stable configuration, one of said configurations being that in which said at least one opposing wall is collapsed proximal to another of said defining opposing walls, and the other of said configurations being that in which said at least one opposing wall is expanded more distally away from said another opposing wall, so that the build-up of pressure in said waste compartment is relieved by the movement of said at least one wall from said one configuration to said other configuration.

2. A device as defined in claim 1, wherein both of said at least one and said another opposing walls have said fold lines and said bi-stable configuration.

3. A device as defined in claims 1 or 2 wherein said waste further comprises compartment side walls connected to said opposing walls so as to give to said compartment a predetermined shape when viewed in plan, and wherein said fold lines form a shape congruent with but smaller than said predetermined shape.

4. A device as defined in claim 1 or 2, wherein said fold lines form a crease that is a closed loop.

5. A device as defined in claim 4, wherein said loop forms a shape that is concentric with the overall shape of said compartment.

6. A device as defined in claims 1 or 2, and further including a storage compartment and a fluid passageway extending between said storage compartment and said detection site along a curved path, at least half of said fluid passageway being parallel to and closely adjacent to at least half of said flow means, so that a roller applied to burst said reaction compartment and said storage compartment can be moved along in a path that will also cover said at least half passageway and flow means.

7. A device as defined in claim 6, wherein said flow means comprise a passageway exiting from each of said compartments, said passageways joining at a location upstream from said detection site, the length of said passageway from said storage compartment to said location being less than the maximum dimension of said storage compartment so that the opportunity for backflow of reaction material within said passageway length is minimized.

* * * * *